US010572181B2

(12) United States Patent
Stephens et al.

(10) Patent No.: US 10,572,181 B2
(45) Date of Patent: Feb. 25, 2020

(54) MULTIPLE STAGE GARBAGE COLLECTOR

(71) Applicant: Microsoft Technology Licensing, LLC, Redmond, WA (US)

(72) Inventors: Maoni Zhang Stephens, Kirkland, WA (US); Patrick H. Dussud, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 112 days.

(21) Appl. No.: 15/422,131

(22) Filed: Feb. 1, 2017

(65) Prior Publication Data

US 2018/0217779 A1  Aug. 2, 2018

(51) Int. Cl.
*G06F 12/00* (2006.01)
*G06F 3/06* (2006.01)
*G06F 12/02* (2006.01)

(52) U.S. Cl.
CPC .......... *G06F 3/0652* (2013.01); *G06F 3/0608* (2013.01); *G06F 3/0685* (2013.01); *G06F 12/0269* (2013.01); *G06F 12/0253* (2013.01)

(58) Field of Classification Search
None
See application file for complete search history.

(56) References Cited

U.S. PATENT DOCUMENTS

| 5,088,036 A | 2/1992 | Ellis et al. |
| 6,065,020 A | 5/2000 | Dussud |
| 6,393,440 B1 | 5/2002 | Salant et al. |
| 6,526,421 B1 | 2/2003 | Houldsworth |
| 6,839,725 B2 | 1/2005 | Agesen et al. |
| 7,174,354 B2 | 2/2007 | Andreasson |
| 7,197,521 B2 | 3/2007 | Subramoney et al. |
| 7,310,655 B2 | 12/2007 | Dussud |
| 7,672,983 B2 | 3/2010 | Printezis et al. |
| 7,962,707 B2 | 6/2011 | Kaakani et al. |
| 8,527,560 B2 | 9/2013 | Lucco et al. |
| 8,583,783 B1 | 11/2013 | Hayward et al. |
| 2002/0147899 A1 | 10/2002 | Lewis |

(Continued)

FOREIGN PATENT DOCUMENTS

WO    2009086424 A1    7/2009

OTHER PUBLICATIONS

"International Search Report and Written Opinion Issued in PCT Application No. PCT/US2017/066240", dated Mar. 15, 2018, 13 pages.
"International Search Report and Written Opinion Issued in PCT Application No. PCT/US2018/015112", dated Apr. 4, 2018, 9 pages.
Thompson, Martin, "Java Garbage Collection Distilled", https://www.infoq.com/articles/Java_Garbage_Collection_Distilled, Jun. 17, 2013, 15 pages.
"Tuning the Memory Management System", https://docs.oracle.com/cd/E13150_01/jrockit_jvm/jrockit/geninfo/diagnos/memman.html, Nov. 18, 2011, 9 pages.

(Continued)

*Primary Examiner* — Baboucarr Faal
(74) *Attorney, Agent, or Firm* — Dicke, Billig & Czaja, PLLC

(57) ABSTRACT

A method for use with a garbage collector to provide different garbage collections is disclosed. The garbage collections are concurrent garbage collection provided in a dedicated thread concurrently running in a computing device with a mutator thread. A heap size stage, from multiple heap size stages including a heap size growth stage and a heap size stable stage, is determined from a free space amount subsequent a garbage collection. A heap stable garbage collection is applied in response to the heap size stage being the heap size stable stage. A heap growth garbage collection is applied in response to the heap size stage being the heap size growth stage.

20 Claims, 4 Drawing Sheets

(56) References Cited

U.S. PATENT DOCUMENTS

| | | |
|---|---|---|
| 2004/0111449 A1 | 6/2004 | Garthwaite |
| 2006/0155791 A1 | 7/2006 | Tene et al. |
| 2006/0167961 A1 | 7/2006 | Fox |
| 2006/0230087 A1 | 10/2006 | Andreasson |
| 2007/0033240 A1 | 2/2007 | Barsness et al. |
| 2010/0114997 A1 | 5/2010 | Micic et al. |
| 2011/0264970 A1 | 10/2011 | Whetsel |
| 2012/0323979 A1 | 12/2012 | Basu et al. |
| 2013/0091186 A1 | 4/2013 | Stephens et al. |
| 2015/0067293 A1 | 3/2015 | Flood et al. |
| 2016/0098229 A1 | 4/2016 | Schreiber et al. |
| 2016/0140036 A1 | 5/2016 | O'meara et al. |
| 2016/0239413 A1* | 8/2016 | Stephens ............ G06F 12/0261 |
| 2017/0344473 A1 | 11/2017 | Gidra et al. |

OTHER PUBLICATIONS

"Tuning for a Small Memory Footprint", https://docs.oracle.com/cd/E13150_01/jrockit_jvm/jrockit/geninfo/diagnos/tune_footprint.html, Nov. 27, 2011, 3 pages.

"Debugging ART Garbage Collection", https://source.android.com/devices/tech/dalvik/gc-debug.html, Oct. 6, 2015, 6 pages.

"Non Final Office Action Issued in U.S. Appl. No. 15/422,102", dated Feb. 26, 2019, 7 Pages.

"Final Office Action Issued in U.S. Appl. No. 15/422,102", dated Aug. 9, 2019, 9 Pages.

\* cited by examiner

MULTIPLE STAGE GARBAGE COLLECTOR

BACKGROUND

Garbage collection is a form of automatic memory management in computing systems. A garbage collector attempts to detect objects no longer used by software applications or programs on the computer system and to recover memory occupied by the objects that are no longer used by software applications or programs running on the computing system. In one example, garbage collection can be contrasted with manual memory management in which a programmer specifies the objects to de-allocate and return to the memory system. Memory management, including garbage collection, can influence performance of the software applications running on the computing device.

Many programming languages include garbage collection. In some programming languages, garbage collection can be included as part of the language specification such as C#, Java, D, Go, and many scripting languages. Additionally, some languages such as C and C++ are designed for manual memory management but include garbage-collected implementations. Further, some languages such as C++ for Common Language Infrastructure (C++/CLI) allow for both garbage collection and manual memory management to co-exist in the same application by using separate memory segments for collected and manually managed objects. Garbage collection is often integrated into the language compiler and the runtime system.

SUMMARY

This summary is provided to introduce a selection of concepts in a simplified form that are further described below in the Description. This summary is not intended to identify key features or essential features of the claimed subject matter, nor is it intended to be used to limit the scope of the claimed subject matter.

Systems and methods for different garbage collections based on one of multiple heap size stages are disclosed. In one example, the multiple garbage collections are concurrent garbage collections provided in a dedicated thread concurrently running in the computing device with a mutator thread. A heap size stage, from multiple heap size stages including a heap size growth stage and a heap size stable stage, is determined from a free space amount subsequent a garbage collection. A heap stable garbage collection is applied in response to the heap size stage being the heap size stable stage. A heap growth garbage collection is applied in response to the heap size stage being the heap size growth stage. In one example, the heap stable and heap growth garbage collections can include different garbage collection goals, tuning parameters, mechanisms, or suitable other distinctions.

BRIEF DESCRIPTION OF THE DRAWINGS

The accompanying drawings are included to provide a further understanding of embodiments and are incorporated in and constitute a part of this disclosure. The drawings illustrate embodiments and together with the description serve to explain principles of embodiments. Other embodiments and many of the intended advantages of embodiments will be readily appreciated, as they become better understood by reference to the following description. The elements of the drawings are not necessarily to scale relative to each other. Like reference numerals designate corresponding similar parts.

DESCRIPTION

In the following Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following description, therefore, is not to be taken in a limiting sense. It is to be understood that features of the various exemplary embodiments described herein may be combined with each other, unless specifically noted otherwise.

Figure 1:
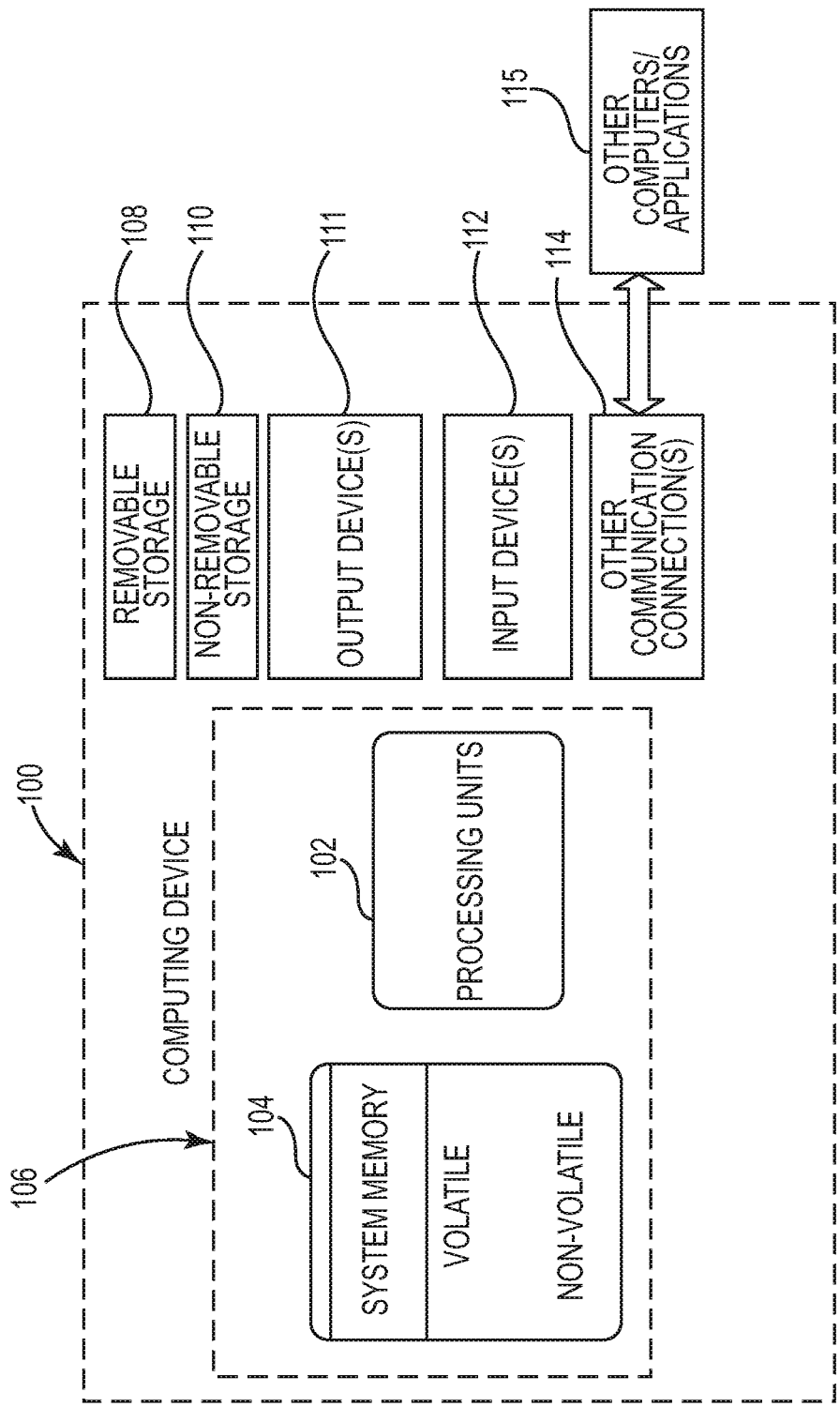
FIG. 1 is a block diagram illustrating an example of a computing device, which can be configured in a computer network to provide, for example, a cloud-computing environment.

FIG. 1 illustrates an exemplary computer system that can be employed in an operating environment and used to host or run a computer application included on one or more computer readable storage mediums storing computer executable instructions for controlling the computer system, such as a computing device, to perform a process. An example of a computer-implemented process includes a concurrent garbage collection that can be stored in a computer memory and executed with a processor to apply one of multiple garbage collection parameters corresponding with multiple heap size stages.

The exemplary computer system includes a computing device, such as computing device 100. In a basic hardware configuration, computing device 100 typically includes a processor system having one or more processing units, i.e., processors 102, and memory 104. By way of example, the processing units may include two or more processing cores on a chip or two or more processor chips. In some examples, the computing device can also have one or more additional processing or specialized processors (not shown), such as a graphics processor for general-purpose computing on graphics processor units, to perform processing functions offloaded from the processor 102. The memory 104 may be arranged in a hierarchy and may include one or more levels of cache. Depending on the configuration and type of computing device, memory 104 may be volatile (such as random access memory (RAM)), non-volatile (such as read only memory (ROM), flash memory, etc.), or some combination of the two. The computing device 100 can take one or more of several forms. Such forms include a tablet, a personal computer, a workstation, a server, a handheld device, a consumer electronic device (such as a video game console or a digital video recorder), or other, and can be a stand-alone device or configured as part of a computer network.

Computing device 100 can also have additional features or functionality. For example, computing device 100 may also include additional storage. Such storage may be removable and/or non-removable and can include magnetic or optical disks, solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Accordingly, a propagating signal by itself does not qualify as storage media. Any such computer storage media may be part of computing device 100.

Computing device 100 often includes one or more input and/or output connections, such as USB connections, display ports, proprietary connections, and others to connect to various devices to provide inputs and outputs to the computing device. Input devices 112 may include devices such as keyboard, pointing device (e.g., mouse, track pad), stylus, voice input device, touch input device (e.g., touchscreen), or other. Output devices 111 may include devices such as a display, speakers, printer, or the like.

Computing device 100 often includes one or more communication connections 114 that allow computing device 100 to communicate with other computers/applications 115. Example communication connections can include an Ethernet interface, a wireless interface, a bus interface, a storage area network interface, and a proprietary interface. The communication connections can be used to couple the computing device 100 to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the Internet, or other network.

Computing device 100 can be configured to run an operating system software program and one or more computer applications, which make up a system platform. A computer application configured to execute on the computing device 100 includes at least one process (or task), which is an executing program. Each process provides the resources to execute the program. One or more threads run in the context of the process. A thread is the basic unit to which an operating system allocates time in the processor 102. The thread is the entity within a process that can be scheduled for execution. Threads of a process can share its virtual address space and system resources. Each thread can include exception handlers, a scheduling priority, thread local storage, a thread identifier, and a thread context, or thread state, until the thread is scheduled. A thread context includes the thread's set of machine registers, the kernel stack, a thread environmental block, and a user stack in the address space of the process corresponding with the thread. Threads can communicate with each other during processing through techniques such as message passing.

An operation may execute in a thread separate from the main application thread. When an application calls methods to perform an operation, the application can continue executing on its thread while the method performs its task. Concurrent programming for shared-memory multiprocessors can include the ability for multiple threads to access the same data. The shared-memory model is the most commonly deployed method of multithread communication. Multiple threads execute on multiple processors, multiple processor cores, multiple logical nodes in a single processor core, and/or other classes of parallelism that are attached to a memory shared between the processors.

The present disclosure relates generally to garbage collectors and methods to provide garbage collection, such as concurrent garbage collection or concurrent and non-compacting garbage collection, used with programming languages or runtime systems in a data processing system such as computing device 100. Aspects of the present disclosure may be embodied as a system, method or computer program product. Accordingly, aspects of the present disclosure may take the form of entirely hardware, entirely software, including firmware, resident software, micro-code, or a combination of software and hardware aspects that may all generally be referred to as a system. Furthermore, aspects of the present disclosure may take the form of a computer program product including one or more computer readable medium or media having computer readable program instruction for causing a processor to carry out the aspects of the disclosure.

Figure 2:
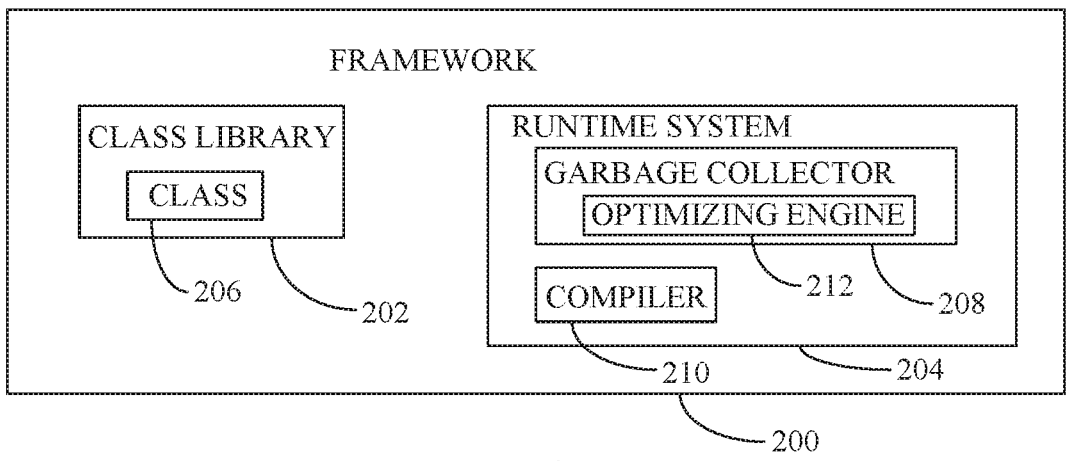
FIG. 2 is a block diagram illustrating an example application framework for execution in the computing device of FIG. 1.

FIG. 2 illustrates features of an example software framework 200, which can be implemented on computing device 100. The framework 200 can be used with developer-written software applications created in one or more framework-compatible languages for one or more platforms. Example framework 200 includes a class library 202 having a runtime library and base class library and an application engine such as a runtime system 204 or virtual machine. In one example, the class library 202 includes a set of classes organized by namespace to define features available in a framework-compatible programming language. Software applications written in a framework-compatible language as source code are compiled into a platform-neutral language, or bytecode, that can be executed in a platform-specific virtual machine installed on the platform, such as computing device 100. The runtime system 204 compiles the bytecode into machine code that is executed on the platform. The runtime system 204 can provides additional services including memory management, type safety, exception handling, garbage collection, security and thread management. Upon execution of the developer-written program, a platform-specific just-in-time compiler 210 of the runtime system 204 translates the byte code into machine code. The compiler 210 can provide a combination of ahead-of-time compilation and interpretation, and the runtime system 204 can handle late-bound data types and enforce security guarantees.

Class library 202 of the example can include one or more class or classes 206 implemented in accordance with the methods disclosed. In general, a class 206 is an extensible program-code-template, or blueprint, for creating objects, providing initial values for state, and implementations of behavior. The class is a construct that enables a developer to create custom types by grouping together variables of other types, methods and events. Class or classes 206 may include class variables, instance variables, local variables, parameters, user-defined methods, inherited states and behaviors, and interfaces. The variable can remain in memory 104 until all references go out of scope. At that time, the runtime system 204 via garbage collector 208 can mark the variable as eligible for garbage collection.

Garbage collector 208 automatically manages the allocation and release of memory for the developer-written application. The runtime system 204 allocates a segment of memory 104 to store and manage objects called the managed heap. (In one example, the managed heap is distinguishable from a native heap in the operating system. For the purposes of this disclosure, "heap" refers to the managed heap.) For each new object, the runtime system 204 allocates memory for the object from the managed heap. In one example, there can be a managed heap for each managed process, and threads in the process allocate memory for objects on the same heap. In another example, the heap can be an accumulation of a large object heap, such as a heap that includes objects over a selected threshold in size, and a small object heap.

As address space becomes occupied on the managed heap, the garbage collector 208 eventually frees some memory. The garbage collector 208 includes an optimizing engine 212 to determine the preferred time or occasion to perform a collection, which can be based upon a dynamically tunable parameter from a previous garbage collection. The garbage collector 208 checks for objects in the managed heap that are no longer being used by the application and performs the operations to reclaim the memory. Garbage collection can occur when the system has low physical memory or if the memory used by allocated objects on the managed heap surpasses an acceptable threshold. In one example, the threshold can be dynamically adjusted as based on a previous garbage collection.

In one example, the heap can be a generational heap. The heap can be organized into multiple generations to tackle long-lived and short-lived objects. Garbage collection primarily occurs with the reclamation of short-lived objects that typically occupy a small part of the heap. One example includes three generations of objects on the heap including a generation 0, generation 1, and generation 2. Generation 0 is the youngest generation and contains short-lived objects such as a temporary variable. Garbage collection occurs most frequently in this generation. In one example, newly allocated objects form a new generation of objects and are implicitly generation 0 collections, unless they are large objects, in which case they go on the large object heap in a generation 2 collection. Many objects are reclaimed for garbage collection in generation 0 and do not survive to the next generation. Generation 1 includes short-lived objects and can serves as a buffer between short-lived objects and long-lived objects. Some example garbage collectors do not include a generation 1 heap and only include heaps for short-lived and long-lived objects. Additionally, one or more generations of short-lived objects can be known as ephemeral generations. Generation 2 includes long-lived objects. An example of a long-lived object is an object in a server application that contains static data that is live for the duration of the process. Garbage collections occur on specific generations as conditions warrant. Collecting a generation means collecting objects in that generation and all its younger generations. A generation 2 garbage collection is typically a full garbage collection because it reclaims all objects in all generations of the managed heap.

Objects that are not reclaimed in a garbage collection are known as survivors and are promoted to the next generation. For example, objects that survive a generation 0 garbage collection are promoted to generation 1, objects that survive a generation 1 garbage collection are promoted to generation 2, and objects that survive a generation 2 garbage collection remain in generation 2.

Before a garbage collection starts, or is triggered, the managed threads can be suspended except for the thread that triggered the garbage collection. The garbage collector can determine whether an object is live via information such as stack variables provided by a just-in-time compiler and stack walker, handles that point to managed objects and that can be allocated by user code or by the runtime, and from static objects in application domains that could be referencing other objects. Each application domain keeps track of its static objects. In one example, garbage collection can occur in a set of phases including marking phase that finds and creates a list of all live objects, a relocating phase that updates the references to the objects that will be compacted, and a reclamation phase that reclaims the space occupied by the dead objects. In some examples, the reclamation phase can include compacting the surviving objects in which objects that have survived a garbage collection are moved toward the older end of the segment. Some example garbage collectors, such as garbage collector 208, do not include a compacting feature. Such non-compacting garbage collectors are prone to heap size growth.

Concurrent garbage collection is a form of garbage collection that enables threads to run concurrently with a dedicated thread that performs the garbage collection for at least some of the duration of the dedicated thread that performs the garbage collection. For example, a concurrent garbage collection can run in the dedicated thread while one or more mutator threads are running, i.e., a thread that mutates the managed heap. Concurrent garbage collection can be performed on generational and non-generational heaps. In one example, concurrent garbage collection affects garbage collections for long-lived objects such as generation 2. For example, garbage collection in generation 0 and generation 1 are performed non-concurrently because they can be completed quickly and not noticeably affect performance.

Concurrent garbage collection can enable some software applications to be more responsive by eliminating or reducing pauses of a software application for a garbage collection. Managed threads can continue to run for at least some of the time while the concurrent garbage collection thread is running. This can eliminate pauses or result in shorter pauses during a garbage collection. Concurrent garbage collection can trade some processor performance and memory for shorter pauses during garbage collection.

Concurrent garbage collector 208 attempts to improve performance via preferred triggering of the collection with optimizing engine 212. Concurrent garbage collector in general presents a performance overhead, and running too often or when not preferred can adversely affects performance of the concurrently running programs. If the collection is triggered to early, the free memory space has not been efficiently used and performance of the concurrently running programs is adversely affected. If the collection is triggered too late and the managed heap runs out of memory space, the generational size of the managed heap may need to be extended which is adversely affects the performance of non-compacting concurrent garbage collectors. Performance of compacting concurrent garbage collectors can suffer as well as mutator threads may have to wait for more memory space to become available.

Concurrent garbage collection is affected by unpredictable factors such as operating system thread scheduling and sudden changes in application behavior as well as other factors. Due to the non-deterministic nature of these factors, predicting the pace of building free memory space and consuming the free memory space is difficult. Thus, triggering concurrent garbage collection from a statically preconfigured amount of free memory space left available in the managed heap is generally inefficient and can run the risk of either running out of free space, and having to acquire more memory from the operating system, or not utilizing the free space built up from a previous garbage collection.

In some circumstances, however, processes are better served or improve performance with a growing heap size. In these circumstances, growing a heap size is justified and even preferred. Examples of preferred heap size growth can include application start up, when memory usage continues to grow, or if an application memory suddenly grows, when an application allocates lots of long-lived data. In these circumstances, application performance or overhead can be adversely affected if the same garbage collections are applied during stable heap-size stages and during heap-size growth stages.

Figure 3:
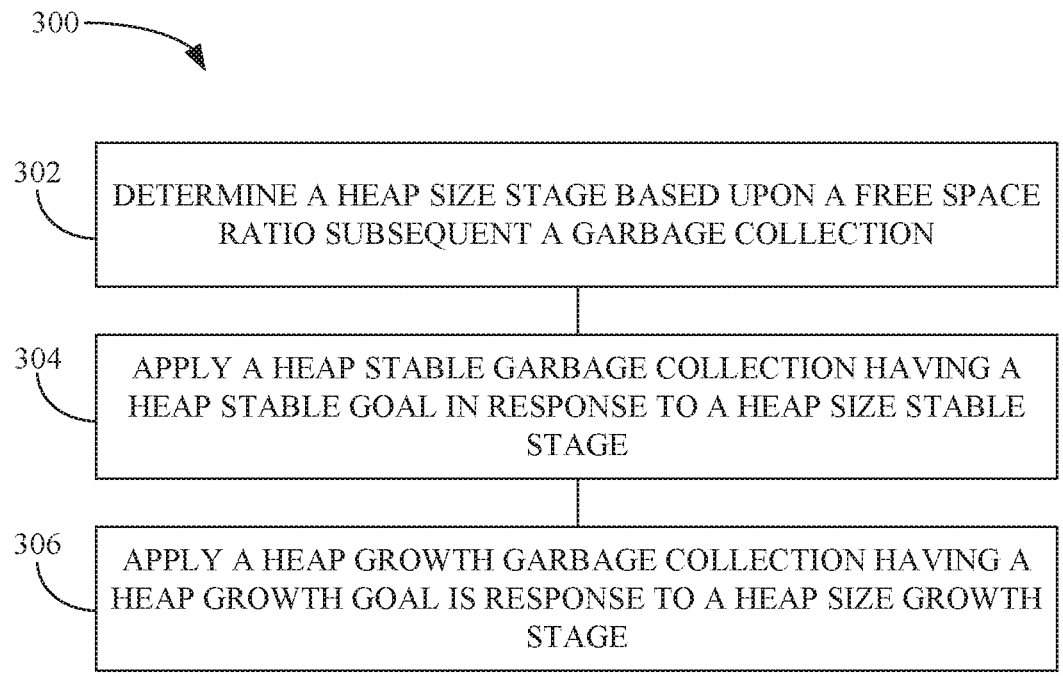
FIG. 3 is a block diagram illustrating an example method of the garbage collector of FIG. 2.

FIG. 3 illustrates an example method 300 for use with garbage collector 208, such as in optimizing engine 212, of software framework 200 to provide multiple concurrent garbage collections for multiple stages of heap size. In one example, the garbage collections are concurrent, non-compacting garbage collections provided in a dedicated thread concurrently running in the computing device 100 with a mutator thread but of differing natures.

A heap size stage, from multiple heap size stages including a heap size growth stage and a heap size stable stage, is determined at 302 from a free space amount at the end of a garbage collection. In one example, the free space amount is a free space ratio of free memory space to the heap size at the completion of garbage collection, i.e., when the free memory space is at the maximum. A heap stable garbage collection is applied in response to the heap size stage being the heap size stable stage at 304. A heap growth garbage collection is applied in response to the heap size stage being the heap size growth stage at 306. In one example, the heap stable and heap growth garbage collections include different garbage collection tuning parameters, mechanisms, or suitable other distinctions. The heap stable garbage collection is attempting to use more of the heap size than the heap growth stage garbage collection.

Figure 4:
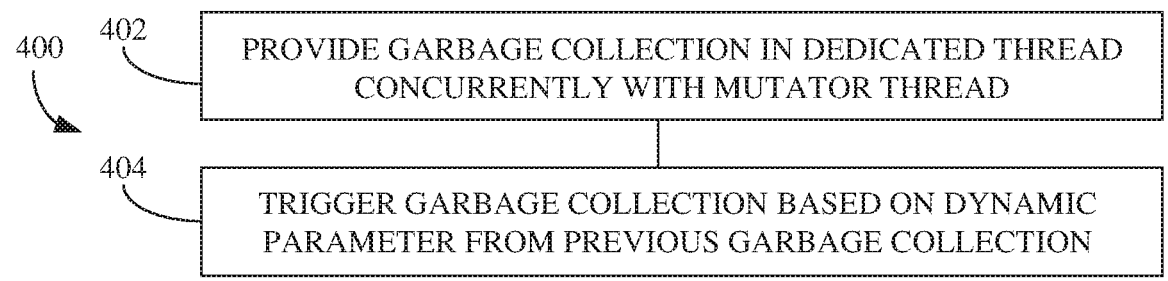
FIG. 4 is a block diagram illustrating an example method of the garbage collector of FIG. 2 in accordance with the method of FIG. 3.

FIG. 4 illustrates an example method 400 for use with the garbage collector 208, such as in optimizing engine 212, of software framework 200 to provide a heap stable stage garbage collection during the heap size stable stage at 304. In one example, the heap stable garbage collection is a concurrent garbage collection provided on a dedicated thread concurrently running in the computing device 100 with a mutator thread at 402. The concurrent garbage collection is triggered based on a dynamically tunable parameter from a previous garbage collection at 404. In this example, the dynamically tunable parameter of 304 is based on a closed-loop feedback of previous garbage collections.

In one example, the optimizing engine 212 schedules the heap stable garbage collection at 304 on a trigger based on closed-loop feedback. The input in one example is the error based on a goal that indicates an amount of free memory space when the free memory space is at the smallest such as right before the heap stable garbage collection rebuilds free space, and the output can include an amount of memory that will be consumed in the free space by other generation allocations before the next garbage collection is triggered. The output can be extended to any other kinds of factors that will denote the triggering of the next concurrent heap stable garbage collection, such as the number of younger generation garbage collections that will be performed before the next concurrent garbage collection is triggered. In one example, an amount of free space is a ratio of free memory space to heap size. In another example, the amount of free space can be a number of bytes of free memory.

To initialize the heap stable garbage collection at 304, the optimizing engine can apply parameters initially configured by the runtime system 200. In one example, a user may further configure or selectively adjust the parameters. For instance, a free memory space goal amount of free space can be selected to include 15% of the heap. The initial trigger can include the goal amount plus an additional free space amount, such as 5%. For example, the initial garbage collection once the stable heap size stage is determined at 302 can be triggered when 20% of the heap is free memory space. An error amount can be set to include the difference between the actual amount of free space at trigger and the goal amount of free space.

Figure 5:
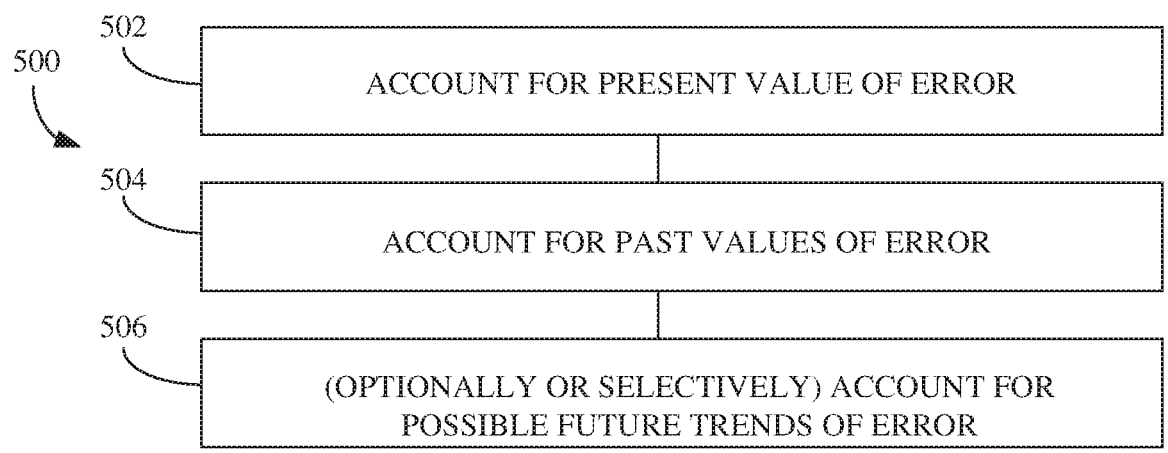
FIG. 5 is a block diagram illustrating an example method in accordance with the method of FIG. 4.

FIG. 5 illustrates an example method 500 for use with the garbage collector 208, such as in optimizing engine 212, of software framework 200 to apply the dynamically tunable parameter for a heap stable garbage collection at 404 using the closed-loop feedback. The current trigger, or new output can be based on one or more of plurality of feedback factors including the error and the previous output based on closed-loop feedback. For example, a first feedback factor can include accounting for present values of error from a set point, or goal at 502. If the error is large and positive, the output will also be large and positive. The second feedback factor can include accounting for past values of the error at 504. If the current output is not sufficiently strong, for example, the second feedback factor of error will accumulate over time, and the optimizing engine 212 will respond by applying a stronger action. The third feedback factor can account for possible future trends of the error and can be based on a current rate of change at 506. In one example, the third feedback factor at 506 can be optionally or selectively applied.

In one example, first feedback factor at 502 includes a constant multiplied by the error amount and the second factor at 404 is the previous output. For example, new_output=previous_output*(1+constant*error_amount). The new_output becomes the previous_output in subsequent garbage collections, and the error_amount is calculated as the difference between the input and the goal.

In one example, the third feedback factor at 506 can include the smaller of the adjustment to the trigger and a preselected amount. In one example, the adjustment can be expressed (new_output−previous_output)/previous_output Thus, if the adjustment is greater than a preselected amount, such as X %, the third feedback factor applied is X %. In one example, the third feedback factor is not applied on each trigger. For example, the third feedback factor can be applied if the new_output crosses the goal amount. In another example of a third feedback factor applied on a crossing of the goal amount, the amount of the adjustment can be set to half of the previous_output and the new_output. In this example, an adjustment_amount added to the new output can be set to (new_output+previous_output)/2.

The heap growth garbage collection at 306, such as the garbage collection at the heap size growth stage, can also be a concurrent garbage collection as described above with reference to method 400 and provided in a dedicated thread concurrently running in the computing device 100 with a mutator thread at 402. When the application starts up, it goes through the heap growth stage. During the life of the application, it may stay at heap stable stage or at various times go through the heap growth stage again, i.e., when the total live data used by the application has increased. A garbage collection goal of a different nature is set for the heap growth stage than the heap stable stage. Instead of trying to use the free space that is built up efficiently, the emphasis is to control how big to allow the heap to grow to be. The heap growth stage goal is based on when the free space is at its largest. In some examples this means when the concurrent garbage collection just finished building the free space. At this time the free space is checked and compared with the heap growth goal. If the free space amount or ratio is higher than that goal, it is treated as the heap stable stage; otherwise it is treated as we are still in heap growth stage because the free space is still small. The output of the heap growth stage may, in some examples, be calculated via the same fashion as the heap stable stage. In another example, the input of the heap growth garbage collection is not adjusted based on a closed-loop feedback control process as in the heap stable garbage collection. In still another example, neither the heap stable garbage collection at 304 nor the heap growth garbage collection at 306 are based on a closed-loop feedback control process of the examples set forth in methods 400, 500.

Figure 6:
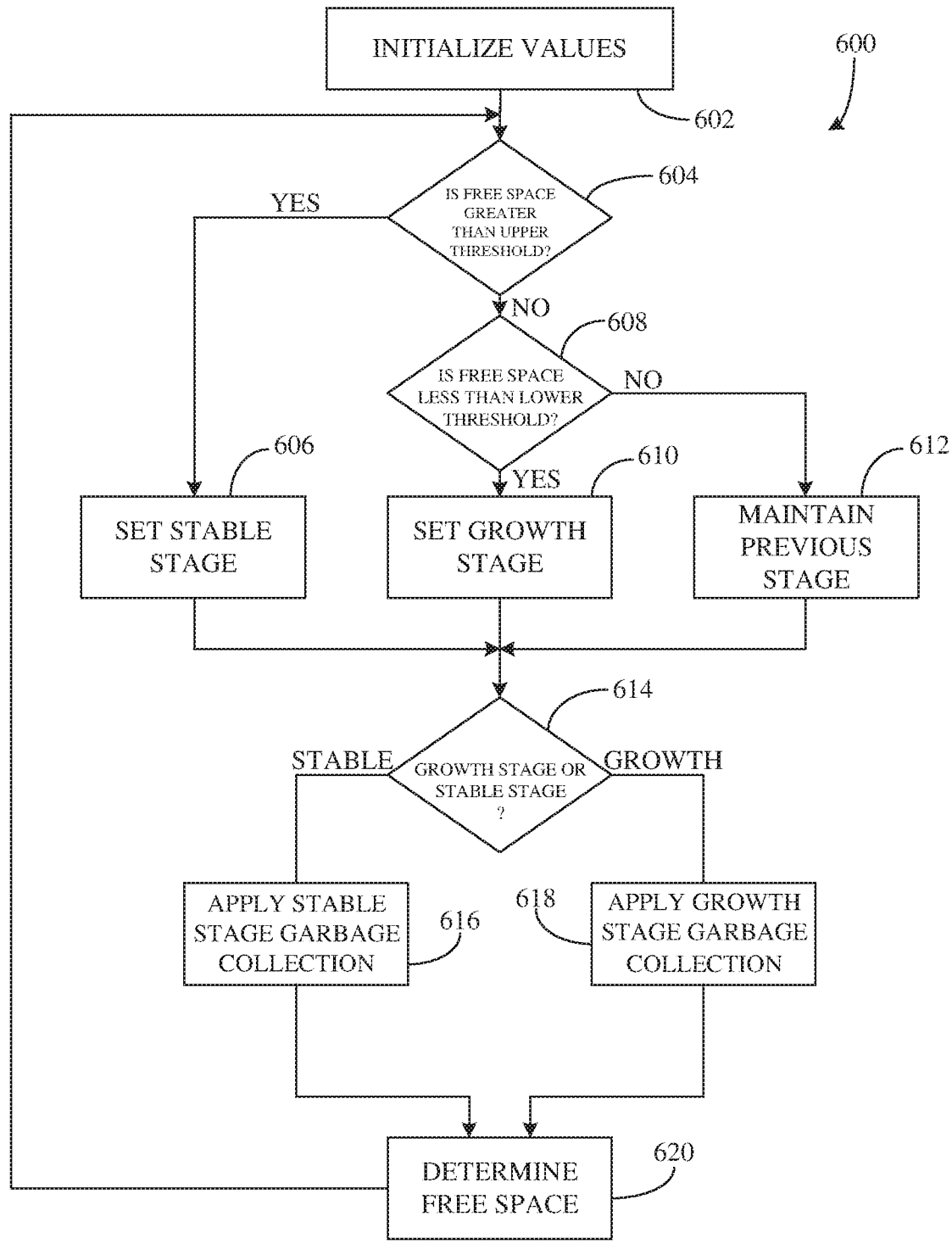
FIG. 6 is a flow diagram illustrating an example feature of the method of FIG. 3.

FIG. 6 illustrates an example method 600 for use with the garbage collector 208, such as in optimizing engine 212, of software framework 200 to determine heap size stage at 302, from multiple heap size stages including the heap size growth stage and the heap size stable stage, using a free space amount at the end of a garbage collection.

As an optimization, instead of a heap growth goal, a range is implemented around that goal to determine the stage. An upper threshold and a lower threshold can be defined at 602. The upper threshold and lower threshold are related to the heap growth goal. For example, the upper threshold can be defined as the heap growth free space goal plus a selected amount, or small delta. The lower threshold can be defined as the heap growth free space goal minus another selected amount, or small delta. In one example, the upper threshold defined at 602 is greater than the lower threshold so the garbage collection does not change when the free space amount is between thresholds. Additionally, an initial stage can be defined at 602, such as the optimizer 212 set to begin the process 600 determined to be the heap size growth stage to apply the heap growth garbage collection, or garbage collection during the heap size growth stage at 304.

```
/* initialize the garbage collector stage to heap growth*/
var bool stableStage = false;
```

If the free space ratio at its largest is greater than the upper threshold at 604, then the heap size stage is determined to be the heap size stable stage at 606. If, instead, the free space ratio at its largest (free space on heap to total size of heap) is less than the lower threshold at 608, then the heap size stage is determined to be the heap size growth stage at 610. If the free space ratio at its largest is neither greater than the upper threshold at 604 nor less than the lower threshold at 608, then the heap size stage from the previous garbage collection is maintained at 612.

```
if (currentFreeSpaceRatio > upperThreshold) {
    stableStage = true;
}
else if (currentFreeSpaceRatio < lowerThreshold {
    stableStage = false;
}
/* otherwise don't change values of stableStage */
```

Depending on whether the heap size stage is the heap size growth stage or the heap size stable stage at 614, the corresponding garbage collection is applied at 616, 618. For example, the heap stable garbage collection is applied at 616 in response to the heap size stage being the heap size stable stage at 614, and the heap growth garbage collection is applied at 618 in response to the heap size stage being the heap size growth stage at 614. Subsequent the garbage collection at 616 or 618, such as at the completion of the garbage collection when free space is likely at the highest amount, the free space ratio is measured at 620. The free space ratio measured at 620 is applied to repeat the process for the next garbage collection at 604.

```
if (stableStage) {
    // use tuning, goals for stable stage garbage collection
}
else {
    /* use a different tuning and goals or mechanism for
    growth stage garbage collection */
}
```

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method of garbage collection in a computing device, comprising:
   determining a heap size stage from a plurality of heap size stages including a heap size growth stage and a heap size stable stage, the determining of the heap size stage from an amount of free space in a previous garbage collection;
   applying a heap stable garbage collection in response to the heap size stage determined to be the heap size stable stage; and
   applying a heap growth garbage collection in response to the heap size stage determined to be the heap size growth stage, the heap stable garbage collection and heap growth garbage collection triggered based on a dynamically tunable parameter related to the amount of free space from a previous garbage collection in a closed feedback loop, an amount of free space at the heap stable garbage collection trigger includes a preselected goal amount of memory space and an error amount of memory space.

2. The method of claim 1 wherein applying the heap stable and heap growth garbage collections include providing a concurrent garbage collection in a dedicated thread concurrently running in the computing device with a mutator thread.

3. The method of claim 2 wherein the heap stable garbage collection is triggered based on a dynamically tunable parameter from previous heap growth garbage collections.

4. The method of claim 3 wherein the tunable parameter includes an amount of free space at a garbage collection trigger of the garbage collection.

5. The method of claim 4 wherein a trigger of a goal that determines which stage the garbage collection is in.

6. The method of claim 3 wherein the amount of free space at the heap stable garbage collection trigger includes a preselected goal amount of memory space and an error amount of memory space.

7. The method of claim 6 wherein the goal amount and the error amount are ratios.

8. The method of claim 3 wherein the heap stable garbage collection is triggered based on the amount of free space at the garbage collection trigger of the previous garbage multiplied by a constant.

9. The method of claim 1 wherein the heap size stage is determined based on an amount of free space at the completion of a previous garbage collection.

10. The method of claim 9 wherein the heap size stage is determined to be the heap size stable stage if the amount of free space at the completion of the previous garbage collection is greater than a selected upper threshold.

11. The method of claim 10 wherein a goal of the heap growth garbage collection includes a free space amount greater than the upper threshold.

12. The method of claim 10 wherein the heap size stage is determined to be the heap size growth stage if the amount of free space at the completion of the previous garbage collection is less than a selected lower threshold.

13. The method of claim 12 wherein a goal of the heap stable garbage collection includes a free space amount less than the lower threshold.

14. The method of claim 12 wherein the lower threshold is less than the upper threshold.

15. A system to reclaim memory, comprising:
a memory device to store a set of instructions; and
a processor to execute the set of instructions to:
determine a heap size stage from a plurality of heap size stages including a heap size growth stage and a heap size stable stage, the heap size stage is determined from a free space of a previous garbage collection;
apply a heap stable garbage collection in response to the heap size stage determined to be the heap size stable stage; and
apply a heap growth garbage collection in response to the heap size stage determined to be the heap size growth stage, the heap stable garbage collection and heap growth garbage collection triggered based on a dynamically tunable parameter related to a memory space goal from a previous garbage collection in a closed feedback loop, a free space amount at the heap stable garbage collection trigger includes a preselected goal amount of memory space and an error amount of memory space.

16. The system of claim 15 wherein the heap stable garbage collection includes a first goal of reclaiming a first amount of free space and the heap growth garbage collection includes a second goal of reclaiming a second amount of free space.

17. The system of claim 16 wherein the heap size stage is determined to be the heap size stable stage if the amount of free space at the completion of the previous garbage collection is greater than a selected upper threshold and the heap size stage is determined to be the heap size growth stage if the amount of free space at the completion of the previous garbage collection is less than a selected lower threshold.

18. The system of claim 17 wherein the first goal includes a free space amount less than the lower threshold and the second goal includes a free space amount greater than the upper threshold.

19. A computer readable medium to store computer readable instructions to control a processor to reclaim memory, the instructions comprising:
provide one of a plurality of concurrent garbage collections in a dedicated thread concurrently running in the computing device with a mutator thread;
determine a heap size stage from a plurality of heap size stages including a heap size growth stage and a heap size stable stage, the heap size stage determined from a previous one of the plurality of concurrent garbage collections;
apply a heap stable garbage collection having a first goal of free memory space in response to the heap size stage determined to be the heap size stable stage; and
apply a heap growth garbage collection having a second goal of free memory space in response to the heap size stage determined to be the heap size growth stage, the heap stable garbage collection and heap growth garbage collection triggered based on a dynamically tunable parameter related to an amount of free memory space from a previous garbage collection in a closed feedback loop, the amount of free memory space at the heap stable garbage collection trigger includes a preselected goal amount of memory space and an error amount of memory space.

20. The computer readable medium of claim 19 wherein the first goal of free space memory is less than the second goal of free space memory.

* * * * *